(12) United States Patent
Chung et al.

(10) Patent No.: US 8,294,750 B2
(45) Date of Patent: Oct. 23, 2012

(54) ELECTRONIC EQUIPMENT HAVING LASER COMPONENT AND CAPABILITY OF INSPECTING LEAK OF LASER AND INSPECTING METHOD FOR INSPECTING LEAK OF LASER THEREOF

(75) Inventors: Yu-Chi Chung, Tao Yuan Shien (TW); Hsin-Hung Lee, Tao Yuan Shien (TW); Hsu-Hung Chen, Tao Yuan Shien (TW)

(73) Assignee: Quanta Computer, Inc. (TW)

( * ) Notice: Subject to any disclaimer, the term of this patent is extended or adjusted under 35 U.S.C. 154(b) by 332 days.

(21) Appl. No.: 12/852,713

(22) Filed: Aug. 9, 2010

(65) Prior Publication Data

US 2011/0267429 A1    Nov. 3, 2011

(30) Foreign Application Priority Data

Apr. 30, 2010 (TW) ................................ 99113766 A (51) Int. Cl.
*H04N 13/00* (2006.01)
(52) U.S. Cl. .......................................................... 348/42
(58) Field of Classification Search ................ 348/42–50
See application file for complete search history.

(56) References Cited

U.S. PATENT DOCUMENTS

2011/0098924 A1*   4/2011   Balardeta et al. ............. 701/213
* cited by examiner

*Primary Examiner* — David Czekaj
*Assistant Examiner* — MD Haque
(74) *Attorney, Agent, or Firm* — Thomas, Kayden, Horstemeyer & Risley, LLP.

(57) ABSTRACT

The invention provides an electronic equipment having a laser component and capability of inspecting leak of laser and an inspecting method for inspecting leak of laser thereof. The electronic equipment according to the invention includes a three-dimensional image-capturing device. According to the invention, the three-dimensional image-capturing device is controlled to capture a two-dimensional image, and to measure an actual depth map. The captured two-dimensional image is processed to obtain an estimated depth map. The invention selectively determines that the laser component occurs leak of laser or malfunctions in accordance with the estimated depth map and the actual depth map.

10 Claims, 5 Drawing Sheets

ELECTRONIC EQUIPMENT HAVING LASER COMPONENT AND CAPABILITY OF INSPECTING LEAK OF LASER AND INSPECTING METHOD FOR INSPECTING LEAK OF LASER THEREOF

CROSS-REFERENCE TO RELATED APPLICATION

This utility application claims priority to Taiwan Application Serial Number 099113766, filed Apr. 30, 2010, which is incorporated herein by reference.

BACKGROUND OF THE INVENTION

1. Field of the Invention

The invention relates to an electronic equipment having a laser component and capability of inspecting leak of laser and an inspecting method for inspecting leak of laser thereof, and more particularly, to an electronic equipment having a laser component and capability of inspecting leak of laser and an inspecting method for inspecting leak of laser thereof suitable for operation at user end.

2. Description of the Prior Art

Laser components have been applied to common consumer electronic equipment such as a monitor using a three-dimensional image-capturing device having a laser component.

Before leaving the factory, electronic equipment having a laser component must go through strict tests, especially the test for leak of laser of the laser component. However, the laser component can be damaged during transportation of the electronic equipment, and then the laser component may occur leak of laser during operation of the electronic equipment. If the user of the electronic equipment uses the electronic equipment occurring leak of laser and exposes to the leak of laser, it can result in a permanent injury to the user. Nevertheless, currently there is no any inspecting method operated at user end for inspecting leak of laser of electronic equipment having a laser component.

Accordingly, a scope of the invention is to provide an electronic equipment having a laser component and capability of inspecting leak of laser and an inspecting method for inspecting leak of laser thereof. More particularly, the electronic equipment according to the invention is suitable for operation at user end to inspect leak of laser.

Additionally, another scope of the invention is to provide an electronic equipment having a laser component and capability of inspecting leak of laser and an inspecting method for inspecting leak of laser thereof. More particularly, the electronic equipment according to the invention utilizes package thereof to inspect leak of laser. Accordingly, the invention provides a simple and environment-friendly method for inspecting leak of laser.

SUMMARY OF THE INVENTION

According to a preferred embodiment of the invention, an electronic equipment includes a housing, a three-dimensional image-capturing device, a processing/controlling device, and a casing. The three-dimensional image-capturing device is installed on the housing and includes a laser component. The processing/controlling device is installed in the housing and is electrically connected to the three-dimensional image-capturing device. The casing is configured to form a dark room. The housing is placed in the dark room. The three-dimensional image-capturing device is controlled by the processing/controlling device to capture a two-dimensional image and to measure an actual depth map. The processing/controlling device also functions processing the captured two-dimensional image to obtain an estimated depth map. The processing/controlling device selectively determines that the laser component occurs leak of laser or malfunctions in accordance with the estimated depth map and the actual depth map.

In an embodiment, the casing is a package box for packing the housing.

In an embodiment, the processing/controlling device also calculates a current depth difference between the estimated depth map and the actual depth map. The processing/controlling device also judges if the current depth difference is larger than a ideal different value, and if YES, determines that the laser component occurs leak of laser or malfunctions.

In an embodiment, the processing/controlling device calculates a texture gradient relative to the captured two-dimensional image, a variance relative to the captured two-dimensional image and a contrast relative to the captured two-dimensional image. The processing/controlling device also processes the texture gradient, the variance and the contrast to obtain the estimated depth map. For example, the processing/controlling device calculates a linear sum of the texture gradient, the variance and the contrast to obtain the estimated depth map.

According to a preferred embodiment of the invention, an inspecting method is used for inspecting leak of laser occurred by a laser component of an electronic equipment. The electronic equipment includes a housing and a three-dimensional image-capturing device. The three-dimensional image-capturing device is installed on the housing and includes a laser component. The inspecting method according to the invention, firstly, places the housing in a dark room. Then, the inspecting method controls the three-dimensional image-capturing device to capture a two-dimensional image. Then, the inspecting method controls the three-dimensional image-capturing device to measure an actual depth map. Then, the inspecting method processes the captured two-dimensional image to obtain an estimated depth map. Finally, the inspecting method, according to the estimated depth map and the actual depth map, judges if the laser component occurs leak of laser or malfunctions.

The advantage and spirit of the invention may be understood by the following recitations together with the appended drawings.

DETAILED DESCRIPTION OF THE INVENTION

The invention provides an electronic equipment having laser component and capability of inspecting leak of laser and an inspecting method for inspecting leak of laser thereof. More particularly, the electronic equipment according to the invention is suitable for operation at user end to inspect leak of laser. Moreover, the invention provides a simple and environment-friendly method for inspecting leak of laser. With following detailed explanations of the preferred embodiments of the invention, the features, spirits, advantages, and feasibility of the invention will be hopefully well described.

Figure 1A:
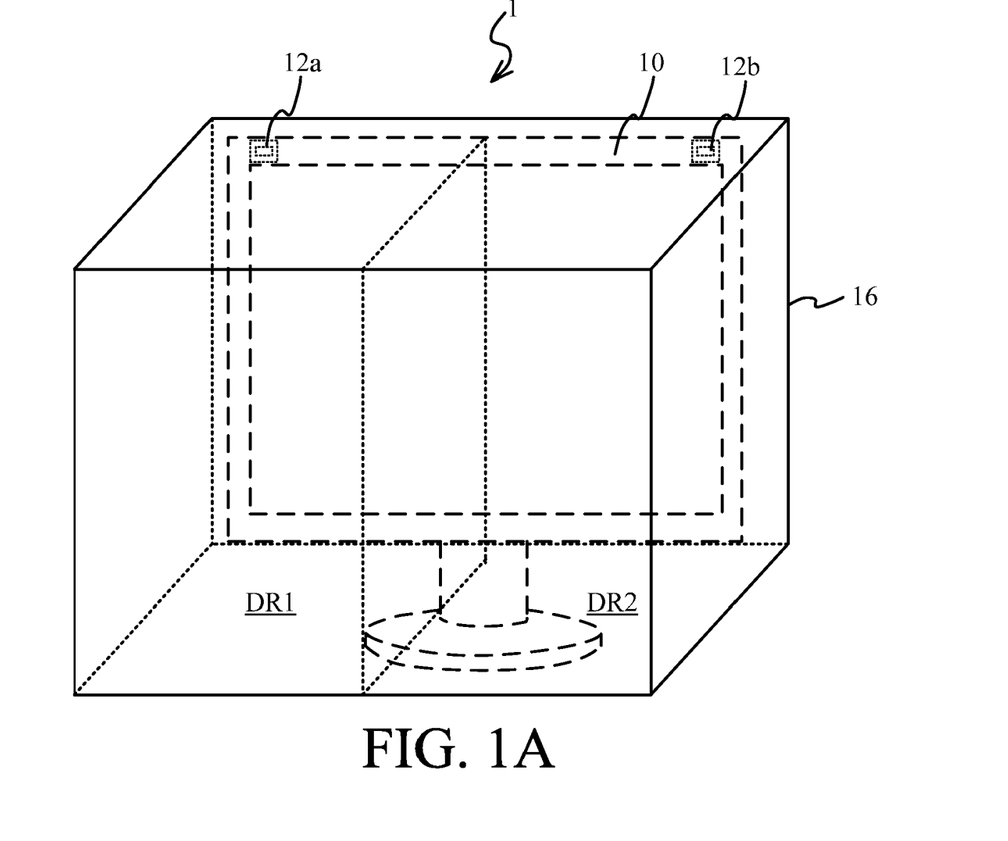
FIG. 1A is a schematic diagram illustrating an electronic equipment according to a preferred embodiment of the invention inspecting leak of laser.
Figure 1B:
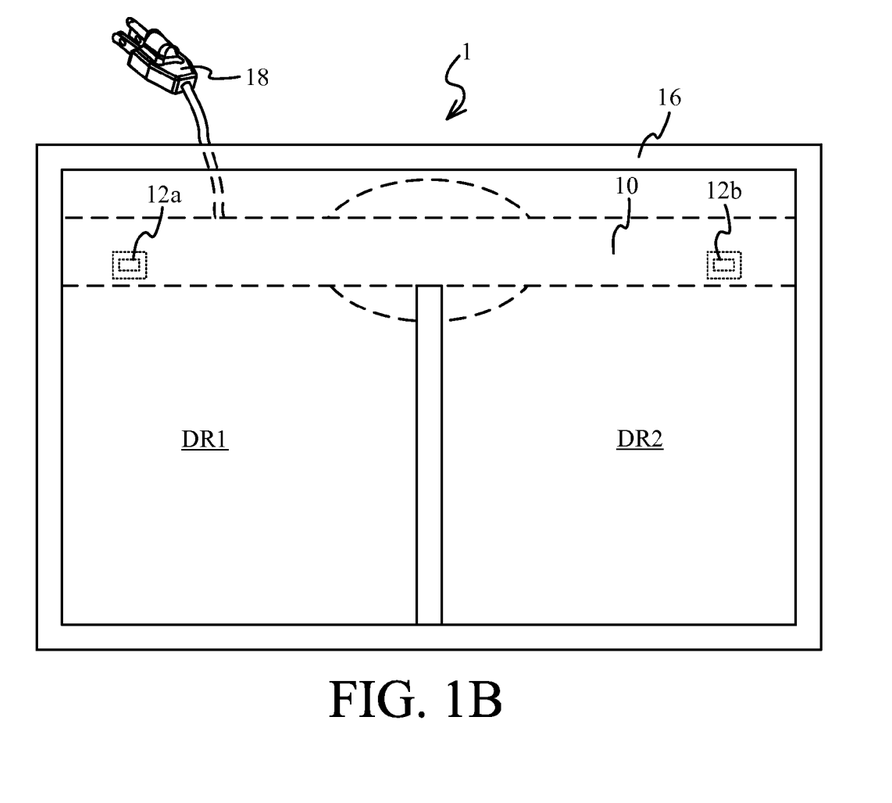
FIG. 1B is a top view of the electronic equipment according to the invention inspecting leak of laser.
Figure 2:
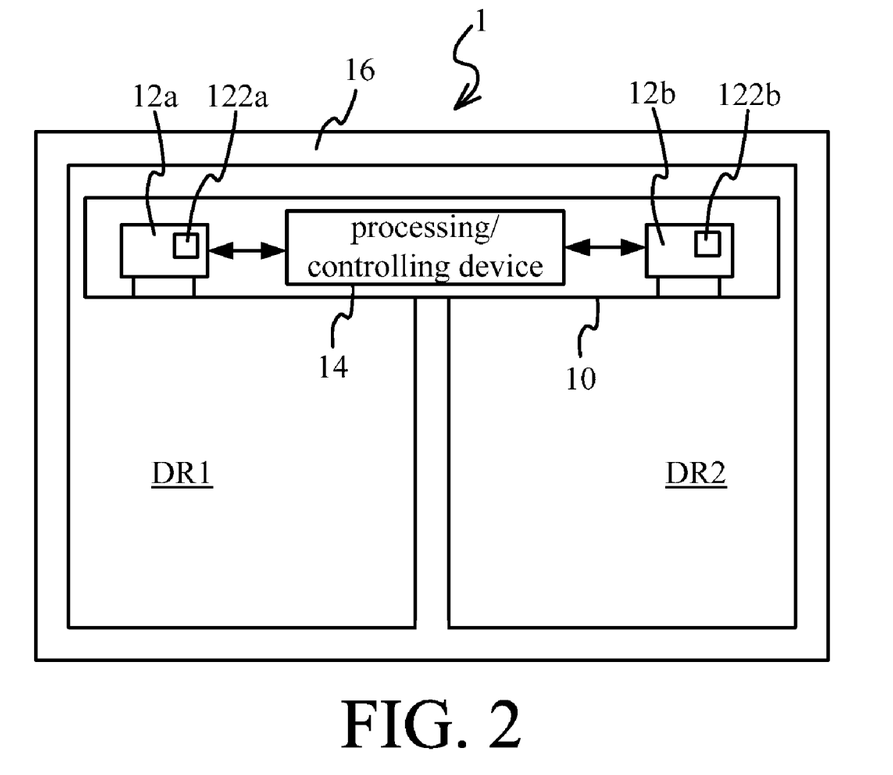
FIG. 2 is a function block diagram illustrating the electronic equipment according to the invention.

Please refer to FIG. 1A, FIG. 1B and FIG. 2. FIG. 1A is a schematic diagram illustrating an electronic equipment 1 according to a preferred embodiment of the invention inspecting leak of laser. FIG. 1B is a top view of the electronic equipment 1 according to the invention inspecting leak of laser. FIG. 2 is a function block diagram illustrating the electronic equipment 1 according to the invention.

As shown in FIG. 1A, FIG. 1B and FIG. 2, the electronic equipment 1 according to the invention includes a housing 10, a three-dimensional image-capturing device 12a, a three-dimensional image-capturing device 14 and a casing 16.

The three-dimensional image-capturing device 12 a is installed on the housing 10 and includes a laser component 122a. The electronic equipment 1 shown in FIG. 1A and FIG. 1B is a monitor. The monitor 1 is equipped with two three-dimensional image-capturing devices (12a, 12b) capable of detecting gestures made by a user in front of the monitor 1. Similarly, a three-dimensional image-capturing device 12b is installed on the housing 10 and includes a laser component 122b.

As shown in FIG. 2, the processing/controlling device 14 is installed in the housing 10 and is electrically connected to the three-dimensional image-capturing device 12a and the three-dimensional image-capturing device 12b respectively.

Particularly, the casing 16 is configured to form a dark room. In practice, the casing 16 is made of monochromatic and non-reflective materials such as a black paper box. As shown in FIG. 1A and FIG. 1B, the electronic equipment 1 has two three-dimensional image-capturing devices (12a, 12b). Therefore, the casing 16 is divided into two dark rooms (DR1, DR2) with a partition made of a material of the same color as the casing 16, as shown in FIG. 1A and FIG. 1B. The housing 10 is placed in the dark rooms (DR1, DR2), and exposes a power plug 18 outside the casing 16, as shown in FIG. 1B. The casing 16 covers the housing 10 and make the two three-dimensional image-capturing devices (12a, 12b) in separate dark rooms. Therefore, during inspecting leak of laser, the two three-dimensional image-capturing devices (12a, 12b) are separated to prevent the two three-dimensional image-capturing devices (12a, 12b) from influencing each other. According to the invention, the number of the dark rooms divided in the casing 16 is determined by the number of the laser components of the electronic equipment 1.

In an embodiment, the casing 16 is a package box for packing the housing 10. Using existing package box to form the dark rooms (DR1, DR2) required for inspecting leak of laser can achieve the purpose of the invention, which is an easy and environment-friendly method for inspecting leak of laser.

As to inspecting leak of laser, following descriptions of the three-dimensional image capturing device 12a is taken for example. As shown in FIG. 2, the three-dimensional image-capturing device 12a is controlled by the processing/controlling device 14 to capture a two-dimensional image and to measure an actual depth map. The processing/controlling device 14 also functions processing the captured two-dimensional image to obtain an estimated depth map. The processing/controlling device 14 selectively determines that the laser component 122a occurs leak of laser or malfunctions in accordance with the estimated depth map and the actual depth map. It is worth noting that according to the invention, as long as leak of laser of any one laser component of the electronic equipment having plural laser components is detected, it is determined that the electronic equipment occurs leak of laser.

In an embodiment, the processing/controlling device 14 also calculates a current depth difference between the estimated depth map and the actual depth map. The processing/controlling device 14 also judges if the current depth difference is larger than a ideal different value, and if YES, determines that the laser component 122a occurs leak of laser or malfunctions In an embodiment, the processing/controlling device 14 calculates a texture gradient relative to the captured two-dimensional image, a variance relative to the captured two-dimensional image and a contrast relative to the captured two-dimensional image. The processing/controlling device 14 also processes the texture gradient, the variance and the contrast to obtain the estimated depth map. For example, the processing/controlling device 14 calculates a linear sum of the texture gradient, the variance and the contrast to obtain the estimated depth map. In the case, the estimated depth map is obtained by converting a single view image captured by a single image capturing device (three-dimensional image-capturing device) into image characteristics and then performing a linear combination. The method is different from typical methods which generally utilize plural image capturing devices to produce parallax. The method according to the invention will be further detailed below.

Regarding image characteristics, the case uses a non-overlapping block of 8×8 pixels as a basic processing unit, as if the original image is reduced 64 times in volume to perform arithmetic process. This can not only accelerate the processing but save the storage space.

The three-dimensional image-capturing device 12a placed in the dark room DR1 may retrieve images having noise, especially pepper and salt noise. Images having noise may easily affect following estimation of image characteristics. Therefore, the case uses median filter to reduce noise. The median filter is a non-linear filter, which does not perform convolution of spatial signals. The median filter can be used for reducing isolated noise to keep sharpness of the image. During the median filtering, a mask of 3×3 pixels moves with one pixel increment from right to left, top to bottom. Under the mask of 3×3 pixels, nine pixels are sorted and the median value of the nine pixels is picked to replace the value of the center image point of the original mask.

Then, texture of each block of 8×8 pixels of the image is statistically calculated. Firstly, the whole image is processed using Law's mask. The case uses eight different 3×3 masks moving with one pixel increment from right to left, top to bottom to perform convolution operation. The case sums up the absolute values of eight calculated results respectively, as the equation (1). Therefore, the gradient of the image can be calculated. This calculation is mainly for detecting horizontal edges or vertical edges, so it can also be regarded as calculation of edge density.

$$f_i^T(x, y) = \left| \sum_{s=-1}^{1} \sum_{t=-1}^{1} W_i(s, t) I(x+s, y+t) \right|, i = 1, 2, \ldots, 8 \quad (1)$$

Afterwards, the case takes a pixel point of which the gradient change is larger than a threshold as the edge point, as equation (2). The case further statistically calculates amount of edge points in each block (as $v_{acum}$ shown in equation (2), if the condition is satisfied, $v_{acum}$ is then accumulated) to calculate the edge density. The edge density of each non-overlapping block of 8×8 pixels is calculated to represent the texture of the block. Accordingly, the larger the calculated edge density is, the smaller the depth is; on the contrary, the smaller the calculated edge density is, the greater the depth is.

$$\text{if } f_{block[N]}^T(x,y) > Th; \text{ which block}[N] = V_{acum};$$
$$V_{acum} = V_{acum} + 1; \text{ else } V_{acum} = 0; \qquad (2)$$

Then, the case normalizes all calculated texture values into 0~255 gray scales. The case normalizes texture values of all above-mentioned non-overlapping blocks of 8×8 pixels into 0 to 255 for ease of use in the following processes. Normalization method is show as equation (3), where max and min represent maximum value and minimum value among all blocks, and $f_{normal}[N]$ represents normalized result of each block.

$$f_{normal}[N] = \frac{block[n] - \min}{\max - \min} \gamma, \text{ which } \gamma = 255 \qquad (3)$$

Then, variance of each block of 8×8 pixels in the image is calculated. The image characteristic reflected by the atmospheric perspective is sharpness. Usually, the object is sharper when it is closer; on the contrary the object is blurrier. This case can calculate variance of each block of 8×8 pixels in the image to represent sharpness of the block. As shown in equation (4), I(x, y) is the image pixel value in the block of 8×8 pixels, and $I_{average}$ is the average value of the pixels in the block of 8×8 pixels. The larger the calculated variance is, the smaller the depth is; on the contrary, the smaller the calculated variance is, the greater the depth is.

$$f^V(u, v) = \frac{1}{64-1} \sum_x \sum_y (I(x, y) - I_{average})^2 \qquad (4)$$

Similarly, the case normalizes all calculated variance values into 0~255 gray scales for ease of use in the following processes. The normalization method is the same as the method for normalizing the texture values.

Then, contrast of each block of 8×8 pixels in the image is calculated. The image characteristic reflected by the atmospheric perspective is sharpness. Usually, the object is sharper when it is closer; on the contrary the object is blurrier. This case can calculate contrast of each block of 8×8 pixels in the image to represent sharpness of the block. As shown in equation (5), $I_{max}$ and $I_{min}$ are the maximum value and minimum value of the entire image pixel values in the block of 8×8 pixels. The larger the calculated contrast value is, the smaller the depth is; on the contrary, the smaller the calculated contrast is, the greater the depth is.

$$f^C(u, v) = \frac{I_{max} - I_{min}}{I_{max} + I_{min}} \qquad (5)$$

Similarly, the case normalizes all calculated contrast values into 0~255 gray scales for ease of use in the following processes. The normalization method is the same as the method for normalizing the texture values.

For any point of the captured two-dimensional image, the case can estimate preliminary depth by three characteristic values: texture gradient, variance and contrast. Then linear sum of the resulting three characteristic values is calculated, as shown in equation (6), to obtain final estimated depth map f. Ideally, the estimated depth map is hopefully approximating the actual depth map g (obtained by measuring with the three-dimensional image capturing device 12a). Thereby, proper parameters can be tuned to make the estimated result more approximate the actual depth value. Finally, the linear sum of the three characteristic values is calculated, where the sum of the three weights of the characteristic values is 1 (i.e., $\omega_1 + \omega_2 + \omega_3 = 1$).

$$f = \omega_1 \times f_1^T + \omega_2 \times f_2^V + \omega_3 \times f_3^C \qquad (6)$$

Figure 3:
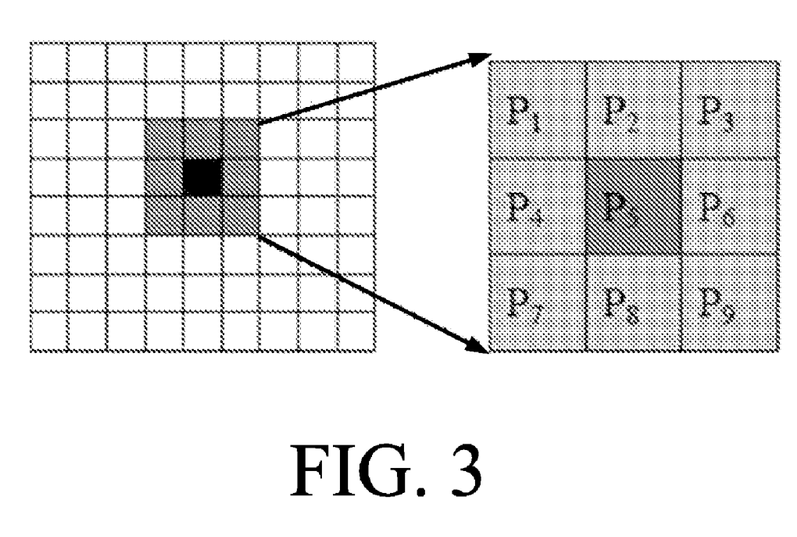
FIG. 3 is a schematic diagram illustrating performing mean filtering using a 3×3 mask on an image to be processed.

Since depths of adjacent regions are theoretically similar, in principle the depth map is hopefully to be smoother. The case chooses to use mean filter, a low-pass filter defined as equation (7). The resulting image output can be written as equation (8). As shown in FIG. 3, in the 3×3 mask of the image to be processed, the black point is the location of h(I, j) to be calculated. When calculating h(I, j) with the spatial filter, the surrounding eight points are needed at the same time. It is called 3×3 mask because 3×3 pixels are used. After getting the nine pixels, h(i, j) is then calculated using equation (9). Therefore, the pixel value of the center point is determined by averaging pixel values of surrounding eight adjacent pixels. The mean filter is mainly used for smoothing the image and for filtering noises.

$$G = g_0 \begin{bmatrix} g_{11} & g_{12} & g_{13} \\ g_{21} & g_{22} & g_{23} \\ g_{31} & g_{32} & g_{33} \end{bmatrix} \equiv \frac{1}{9} \begin{bmatrix} w_1 & w_2 & w_3 \\ w_4 & w_5 & w_6 \\ w_7 & w_8 & w_9 \end{bmatrix} = \frac{1}{9} \begin{bmatrix} 1 & 1 & 1 \\ 1 & 1 & 1 \\ 1 & 1 & 1 \end{bmatrix} \qquad (7)$$

$$h(i, j) = \sum_{k=1}^{3} \sum_{l=1}^{3} g(i-k, j-l) p(k, l) \qquad (8)$$

$$h(i, j) = w_1 p_1 + w_2 p_2 + w_3 p_3 + w_4 p_4 + w_5 p_5 + w_6 p_6 + w_7 p_7 + w_8 p_8 + w_9 p_9 \qquad (9)$$
$$= \frac{(p_1 + p_2 + p_3 + p_4 + p_5 + p_6 + p_7 + p_8 + p_9)}{9}$$

Since the three-dimensional image capturing device generates distance information (i.e., depth information) for each pixels of the image, the case also uses non-overlapping block of 8×8 pixels to calculate average depth value in the block, as shown in equation (10). Then these representative values of the block are normalized to 0~255 gray scales for ease of use in the following processes. The normalization method is the same as the method for normalizing the texture values.

$$g = f^D(u, v) = \frac{1}{64} \sum_x \sum_y I_d(x, y) \qquad (10)$$

Then, a similarity measure is performed on the two depth information calculated above. The case uses distance measures principle, which calculates the whole distance between the samples to be tested (i.e., the estimated depth map and the actual depth map). The measure is implemented using Euclidean distance, as shown in equation (11). In equation (11), $f_k$ represents the depth value of the kth block of the estimated depth map; $g_k$ represents the depth value of the kth block of the actual depth map; and the calculated result is the distance between the two depths.

$$D_{act} = \left(\sum_{k=1}^{N}(f_k - g_k)^2\right)^{\frac{1}{2}} \quad (11)$$

Above calculated difference value $D_{act}$ is compared with a ideal different value $D_{golden}$ stored in hardware using a Manhattan distance principle, as shown in equation (12). If the resulting difference value is larger than a predetermined threshold, it is determined that the laser component 122a occurs leak of laser or malfunctions.

$$D = |D_{act} - D_{golden}| \quad (12)$$
$$result = \begin{cases} \text{Fail,} & \text{if } D > Th \\ \text{Pass,} & \text{else} \end{cases}$$

Figure 4:
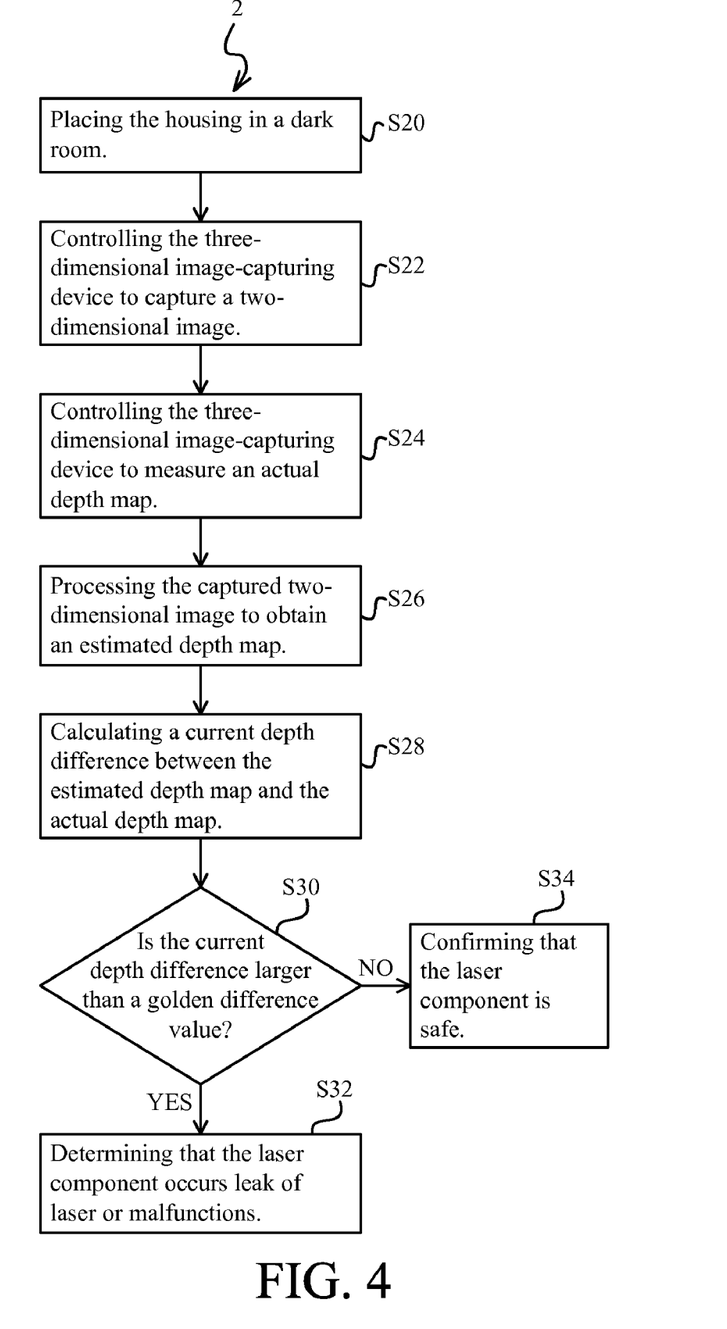
FIG. 4 is a flow chart illustrating an inspecting method according to a preferred embodiment of the invention.

Please refer to FIG. 4. FIG. 4 is a flow chart illustrating an inspecting method 2 according to a preferred embodiment of the invention. The inspecting method 2 according to the invention is used for inspecting leak of laser occurred by laser components (122a, 122b) of an electronic equipment 1 as shown in FIG. 1A and FIG. 1B. The implementation background of the inspecting method 2 according to the invention is an electronic equipment including a housing and a three-dimensional image capturing device. The three-dimensional image capturing device is installed on the housing and includes a laser component.

The inspecting method 2 according to the invention, firstly, performs step S20 to place the housing in a dark room.

Then, the inspecting method 2 performs step S22 to control the three-dimensional image-capturing device to capture a two-dimensional image.

Next, the inspecting method 2 performs step S24 to control the three-dimensional image-capturing device to measure an actual depth map.

Afterwards, the inspecting method 2 performs step S26 to process the captured two-dimensional image to obtain an estimated depth map.

Finally, the inspecting method 2, according to the estimated depth map and the actual depth map, judges if the laser component occurs leak of laser or malfunctions. For example, the inspecting method 2 performs step S28 to calculate a current depth difference between the estimated depth map and the actual depth map. After step S28, the inspecting method 2 performs step S30 to judge if the current depth difference is larger than a ideal different value. If the judged result in step S30 is YES, the inspecting method 2 performs step S32 to determine that the laser component occurs leak of laser or malfunctions. If the judged result in step S30 is NO, the inspecting method 2 performs step S34 to confirm that the laser component is in a safe state.

In an embodiment, the dark room is formed by a package box for packing the housing.

In one embodiment, the step S26 is also to calculate a texture gradient relative to the captured two-dimensional image, a variance relative to the captured two-dimensional image and a contrast relative to the captured two-dimensional image, and to process the texture gradient, the variance and the contrast to obtain the estimated depth map. For example, a linear sum of the texture gradient, the variance and the contrast is calculated to obtain the estimated depth map. The embodiment of calculating the texture gradient, the variance and the contrast is as described above and is not mentioned again here.

With above detailed explanation of the invention, it is clear that the electronic equipment according to the invention is suitable for operation at user end to inspect leak of laser. Moreover, the inspecting method according to the invention is a simple and environment-friendly method for inspecting leak of laser.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electronic equipment, comprising:
   a housing;
   a three-dimensional image-capturing device being installed on the housing and comprising a laser component;
   a processing/controlling device, installed in the housing and electrically connected to the three-dimensional image-capturing device; and
   a casing configured to form a dark room, wherein the housing is placed in the dark room, the three-dimensional image-capturing device is controlled by the processing/controlling device to capture a two-dimensional image and to measure an actual depth map, the processing/controlling device functions processing the captured two-dimensional image to obtain an estimated depth map, and selectively determining that the laser component occurs leak of laser or malfunctions in accordance with the estimated depth map and the actual depth map.

2. The electronic equipment of claim 1, wherein the processing/controlling device also calculates a current depth difference between the estimated depth map and the actual depth map, judges if difference between the current depth difference and an ideal different value is larger than a predetermined threshold, and if YES, determines that the laser component occurs leak of laser or malfunctions.

3. The electronic equipment of claim 1, wherein the casing is a package box for packing the housing.

4. The electronic equipment of claim 1, wherein the processing/controlling device calculates a texture gradient relative to the captured two-dimensional image, a variance relative to the captured two-dimensional image and a contrast relative to the captured two-dimensional image, and processes the texture gradient, the variance and the contrast to obtain the estimated depth map.

5. The electronic equipment of claim 4, wherein the processing/controlling device calculates a linear sum of the texture gradient, the variance and the contrast to obtain the estimated depth map.

6. An inspecting method, an electronic equipment comprising a housing and a three-dimensional image-capturing device, the three-dimensional image-capturing device comprising a laser component, said inspecting method being for inspecting leak of laser occurred by the laser component, said inspecting method comprising the steps of:
   (a) placing the housing in a dark room;
   (b) controlling the three-dimensional image-capturing device to capture a two-dimensional image;
   (c) controlling the three-dimensional image-capturing device to measure an actual depth map;
   (d) processing the captured two-dimensional image to obtain an estimated depth map; and (e) according to the estimated depth map and the actual depth map, judging if the laser component occurs leak of laser or malfunctions.

7. The inspecting method of claim 6, wherein step (e) is also to calculate a current depth difference between the estimated depth map and the actual depth map, to judge if difference between the current depth difference an ideal different value is larger than a predetermined threshold, and if YES, to determine that the laser component occurs leak of laser or malfunctions.

8. The inspecting method of claim 6, wherein the dark room is formed by a package box for packing the housing.

9. The inspecting method of claim 6, wherein step (d) is also to calculate a texture gradient relative to the captured two-dimensional image, a variance relative to the captured two-dimensional image and a contrast relative to the captured two-dimensional image, and to process the texture gradient, the variance and the contrast to obtain the estimated depth map.

10. The inspecting method of claim 9, wherein step (d) is to calculate a linear sum of the texture gradient, the variance and the contrast to obtain the estimated depth map.

* * * * *